(12) United States Patent
Saitoh et al.

(10) Patent No.: US 6,520,636 B2
(45) Date of Patent: Feb. 18, 2003

(54) NOSEPIECE ASSEMBLY FOR AN ADJUSTABLE EYEGLASS FRAME

(75) Inventors: Masatoshi Saitoh, Saitama-ken (JP); Tohru Negishi, Saitama-ken (JP)

(73) Assignee: Youchi Kaihatsu Co., Ltd., Tokyo (JP)

( * ) Notice: Subject to any disclaimer, the term of this patent is extended or adjusted under 35 U.S.C. 154(b) by 0 days.

(21) Appl. No.: 09/885,505

(22) Filed: Jun. 20, 2001

(65) Prior Publication Data
US 2001/0055093 A1 Dec. 27, 2001

(30) Foreign Application Priority Data

Jun. 21, 2000 (JP) ........................ 2000-224573
Nov. 22, 2000 (JP) ........................ 2000-396241
Mar. 26, 2001 (JP) ........................ 2001-130312

(51) Int. Cl.$^7$ .................................. G02C 1/02
(52) U.S. Cl. .................. 351/137; 351/136; 351/138
(58) Field of Search .................. 351/137, 136, 351/138, 139, 120

(56) References Cited

U.S. PATENT DOCUMENTS

| | | | |
|---|---|---|---|
| 2,350,386 A | 6/1944 | Christman | |
| 2,410,584 A | 11/1946 | Jencks | |
| 5,351,099 A | 9/1994 | Winkler et al. | |
| 5,971,538 A | * 10/1999 | Heffner | 351/137 |
| 6,183,080 B1 | 2/2001 | Negishi | |

FOREIGN PATENT DOCUMENTS

| | | |
|---|---|---|
| EP | 0116093 A1 | 8/1984 |
| EP | 579373 A1 | 1/1994 |
| EP | 936488 A1 | 8/1999 |
| EP | 0936488 A1 | 8/1999 |
| EP | 0971255 A2 | 1/2000 |
| JP | 42-9250 | 5/1942 |
| JP | 62-22131 | 5/1987 |
| JP | 6333125 | 3/1988 |
| JP | 227115 | 2/1990 |
| JP | 396620 | 10/1991 |
| JP | 2536872 | 11/1992 |
| JP | 734072 | 4/1995 |
| JP | 9185020 | 7/1997 |
| JP | 2000147437 | 5/2000 |

* cited by examiner

Primary Examiner—Hung Xuan Dong
(74) Attorney, Agent, or Firm—Clifford W. Browning; Woodard, Emhardt, Naughton, Moriarty & McNett LLP

(57) ABSTRACT

An adjustable eyeglass frame includes a lens frame assembly adapted to hold a pair of lenses, and a nosepiece assembly including a pad mount attached to the lens frame assembly. The nose piece assembly has a pair of legs connected to the pad mount, a pair of nose pads carried by the legs and pivotably movable toward and away from each other, and a bias mechanism for biasing the nose pads toward each other so that the nose pads are safely held in any selected vertical positions.

17 Claims, 13 Drawing Sheets

NOSEPIECE ASSEMBLY FOR AN ADJUSTABLE EYEGLASS FRAME

BACKGROUND OF THE INVENTION

The present invention generally relates to eyeglass frames and in particular, to an adjustable eyeglass frame wherein a pair of nose pads are movable between selected vertical positions.

Conventional eyeglass frames typically include a pair of fixed pad arms and oval nose pads secured to the pad arms with limited movement. In known design, the nose pads can not universally fit all noses. In most cases, the optician is required to adjust the nose pads to comfortably fit over a particular size or shape of the nose. This adjustment is, however, time-consuming and cumbersome. Also, the nose pads can cause severe pressure indentation of the skin of the nose after prolonged use in one position of poorly fitting eyeglasses.

Various attempts have been made to obviate the difficulties encountered in the use of conventional eyeglass frames. For example, Japanese laid-open utility model publication No. 63-33125 teaches the use of a pair of elongated nose pads bent rearwardly toward a wearer's nose. However, no adjustment is possible to take into account different sizes and shapes of the nose since the upper and lower ends of the nose pads are permanently secured to a lens frame assembly. Japanese laid-open utility model publication No. 3-96620 also discloses a pair of elongated nose pads pivotably mounted to adjacent lens mounts and capable of rotation in a plane parallel to the plane of lenses. A wedge-like element is slidably mounted to a lens frame assembly. The wedge-like element is vertically insertable between the upper end of the elongated nose pads to pivotably move the nose pads toward and away from each other. However, these nose pads can cause slippage since no force is applied to hold the nose pads over the nose of a wearer. Movable nose pads are also disclosed by Japanese laid-open utility model publication No. 2-27115, Japanese utility model publication No. 42-9250 and Japanese patent publication No. 7-34072, but none of them are satisfactory.

Accordingly, it is an object of the present invention to provide an adjustable eyeglass frame which enables a pair of nose pads to be held in any selected vertical positions and angularly adjustable to comfortably fit over a wearer's nose.

SUMMARY OF THE INVENTION

To achieve the foregoing object, the present invention provides an adjustable eyeglass frame comprising a lens frame assembly adapted to hold a pair of lenses, and a nosepiece assembly including at least one pad mount mounted to the lens frame assembly, a pair of legs connected to the pad mount, a pair of nose pads carried by the legs and movable toward and away from each other, and a bias mechanism for biasing the nose pads toward each other. With this arrangement, the nose pads can be held in any selected vertical positions and angularly adjusted to comfortably fit over a wearer's nose.

In one preferred embodiment, the lens frame assembly includes a pair of lens mounts and a bridge extending between the lens mounts. A pair of pad mounts are pivotably secured to the bridge of the lens frame assembly and capable of rotation about a substantially horizontal axis. The legs are firmly secured to the pad mounts. The nose pads are elongated in a vertical plane and bent rearwardly toward a wearer's nose. The nose pads may be made of a suitable elastomeric or resilient material such as synthetic rubber. The bias mechanism includes an elongated spring extending between the pad mounts. Alternatively, the bias mechanism may include a leaf spring extending between the pad mounts. When the eyeglass frame is in its initial position, the nose pads are oriented to slightly diverge toward the mouth of the wearer. When the eyeglass frame is moved to its lowered position, the nose pads are upwardly or outwardly rotated to constantly fit over the wearer's nose. The nose pads can be safely held in any selected vertical positions due to inward bias by the bias mechanism. The pad mount has opposite tabs, and a pair of adjustable stoppers extending through the tabs and selectively positioned to adjustably limit outward angular movement of the nose pads.

In another embodiment, the single pad mount is secured to the bridge. The legs are pivotably mounted to the pad mount and capable of rotation about a substantially vertical axis. The bias mechanism includes a first magnet disposed in the pad mount, and second and third magnets disposed in the respective legs. The first magnet has a polarity opposite that of the second and third magnets. Alternatively, the first, second and third magnets may have an identical polarity. In such a case, the pad mount may include a pair of spaced stoppers for limiting inward angular movement of the nose pads.

BRIEF DESCRIPTION OF THE DRAWINGS

For a more complete understanding of the present invention, reference will now be made to the following detailed description of preferred embodiments taken in conjunction with the accompanying drawings, in which.

DETAILED DESCRIPTION OF THE INVENTION

Throughout the following description and drawings, an identical reference number is used to refer to the same component shown in multiple figures of the drawing.

Figure 1:
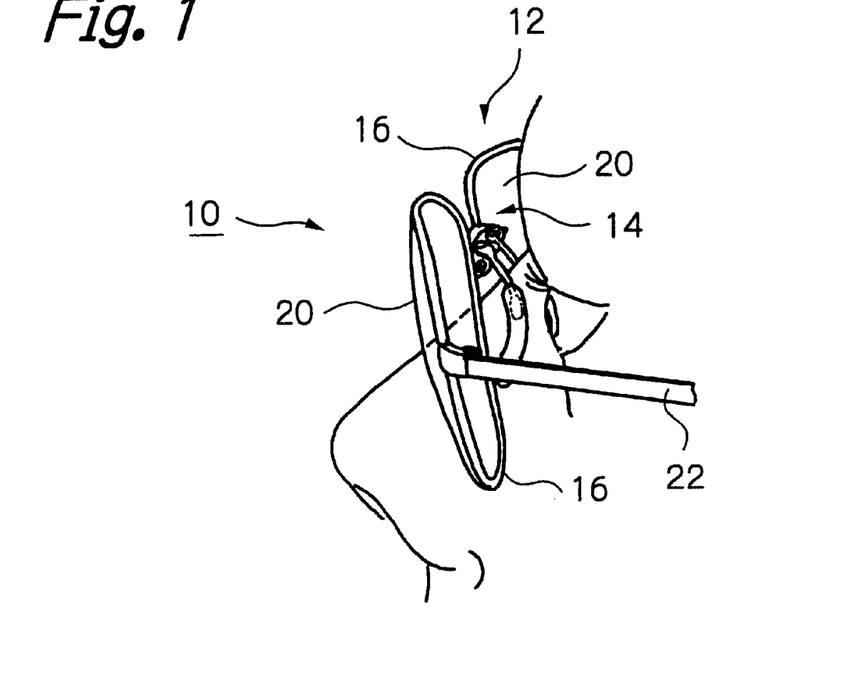
FIG. 1 is a perspective view of an adjustable eyeglass frame according to one embodiment of the present invention, with a pair of elongated nose pads in their initial position.
Figure 2:
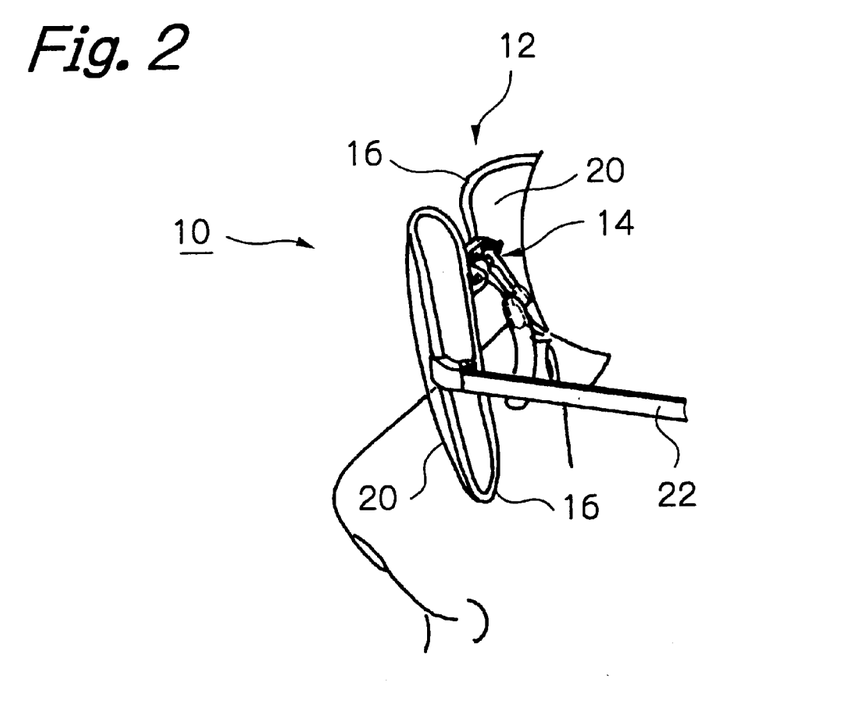
FIG. 2 is a view similar to that of FIG. 1, but showing that the nose pads are moved to their lowered position.
Figure 3:
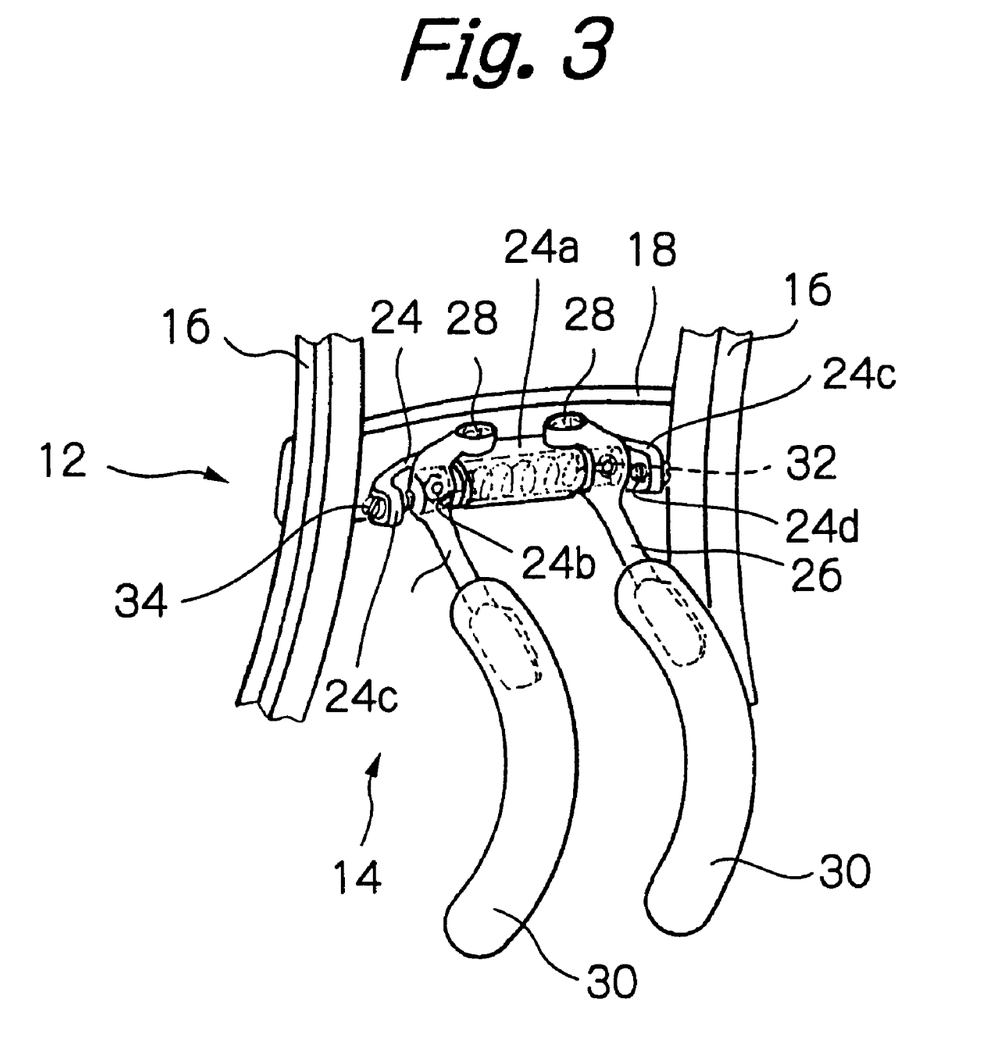
FIG. 3 is an enlarged perspective view of a nosepiece assembly shown in FIG. 1.

Referring now to FIGS. 1 to 3, there is shown an adjustable eyeglass frame generally indicated at 10 and assembled according to one embodiment of the present invention. The eyeglass frame 10 generally includes an lens frame assembly 12, and a nosepiece assembly 14. The lens frame assembly 12 includes a pair of lens mounts 16 joined by a bridge 18 and adapted to hold a pair of lenses 20, and a pair of temples 22 (only one is shown in FIGS. 1 and 2) hingedly supported on the lens mounts 16. Illustratively, each of the lenses 20 is bifocal and has distance and reading segments at its upper and lower ends, respectively.

As shown best in FIG. 3, the nosepiece assembly 14 includes an elongated bracket or pad mount 24 permanently attached to the nasal or rear side of the bridge 18 by, for example, welding and having an arch-shaped block 24a at its center, a pair of bent legs 26 having a proximal end pivotally connected to the top of the block 24a through pivot pins 28 and capable of rotation about a substantially vertical axis, and a pair of nose pads 30 made of a suitable elastomeric material such as synthetic rubber and carried by the distal end of the legs 26. The nose pads 30 are vertically elongated and bent rearwardly toward the nose of a wearer (see FIGS. 1 and 2). A through bore 24b is defined in the block 24a to receive a coil spring 32. Opposite ends of the coil spring 32 are connected to the legs 26 so that the legs 26 and thus, the nose pads 30 are inwardly biased toward each other. Opposite ends of the pad mount 24 are rearwardly bent at ninety degrees to provide a pair of opposite tabs 24c. The tabs 24c have threaded apertures 24d to threadably receive adjustable stoppers or screws 34. The screws 34 serve as a means for adjustably limiting outward angular movement of the nose pads 30. The amount of rotation of the nose pads 30 depends on the distance between the screws 34 and the legs 26 and also, determines the amount of vertical displacement of the lens frame assembly 12.

When the eyeglass frame 10 is initially worn as shown in FIG. 1, the reading segment of the lenses 20 is positioned directly before the eyes of the wearer. At this time, the elongated nose pads 30 slightly diverge toward the wearer's mouth (not shown). As the lens frame assembly 12 is lowered along the nose of the wearer, the nose pads 30 are gradually outwardly rotated about the pivot pins 28. When the legs 26 are brought into contact with the screws 34, the distance segment of the lenses 20 is then positioned directly before the eyes of the wearer. As shown in FIG. 2, the nose pads 30 significantly diverge toward the mouth of the wearer when the lens frame assembly 12 is in its lowered position. Illustratively, the lenses 20 have two focal fields, but they may have a single, or three or more focal fields. Advantageously, the nose pads 30 are moveable between any selected vertical positions and angularly adjustable to comfortably fit over a wearer's nose.

Figure 4:
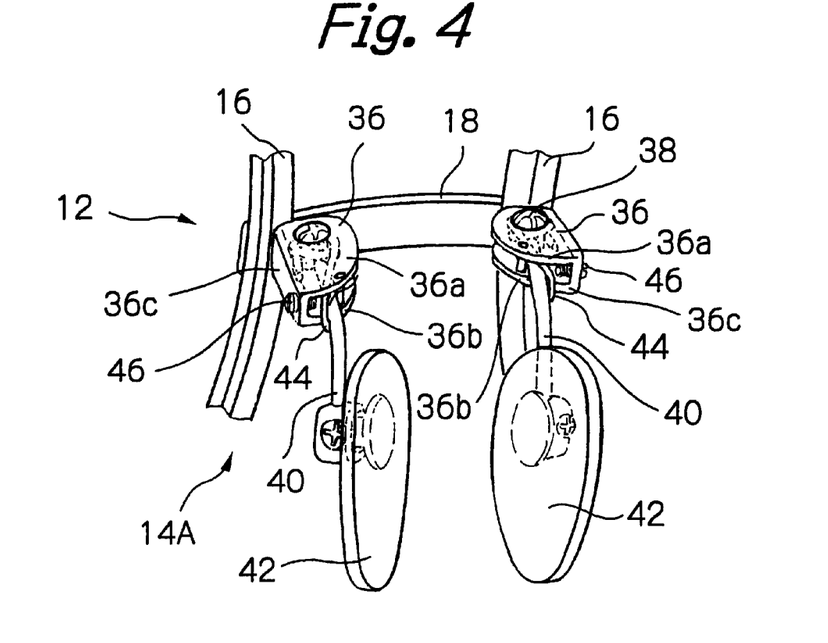
FIGS. 4 to 8 are enlarged perspective views of modified nosepiece assemblies with various forms of springs as a bias mechanism.

FIG. 4 shows another embodiment of the adjustable eyeglass frame according to the present invention. In this embodiment, a nosepiece assembly 14A includes a pair of separate pad mounts 36 permanently attached directly to the respective lens mounts 16. Each of the pad mounts 36 has upper and lower plates 36a and 36b joined by a side plate 36c. A pair of pins 38 extend between the upper and lower plates 36a and 36b of the pad mounts 36. A pair of legs 40 are pivotally mounted to the pad mounts 36 and rotatable about a substantially vertical axis. A pair of conventional oval nose pads 42 are secured to the distal end of the legs 40. A pair of springs 44 are disposed within the pad mounts 36. The springs 44 have a proximal end secured within the pad mounts 36 and a distal end connected to the legs 40 such that the nose pads 42 are inwardly biased toward each other. A pair of adjustable stoppers or screws 46 extend through the side plates 36c of the pad mounts 36 so as to adjustably limit outward angular movement of the nose pads 42.

Figure 5:
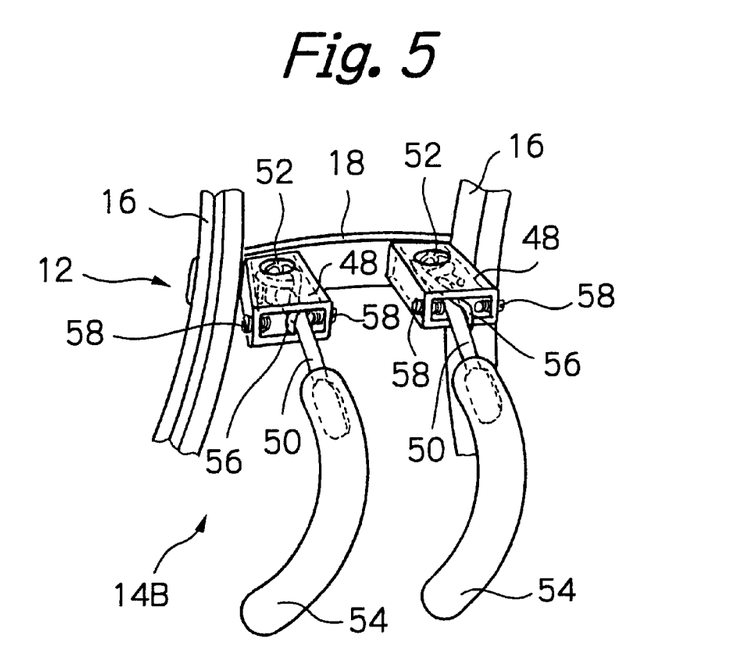

FIG. 5 shows a modified form of the nosepiece assembly shown in FIG. 4. Illustratively, a nosepiece assembly 14B includes a pair of rectangular pad mounts 48 permanently secured to the bridge 18, a pair of legs 50 pivotally mounted to the pad mounts 48 through pins 52, and a pair of elongated nose pads 54 carried by the legs 50 and bent toward a wearer's nose (not shown). As in the embodiment shown in FIG. 4, a pair of springs 56 are disposed within the pad mounts 48. The springs 56 have a proximal end secured within said pair of pad mounts 48 and a distal end connected to the legs 50 such that the nose pads 54 are inwardly biased toward each other. A pair of opposite adjustable stoppers or screws 58 extend into each of the pad mounts 48 to adjustably limit outward and inward angular movement of the nose pad 54.

Figure 6:
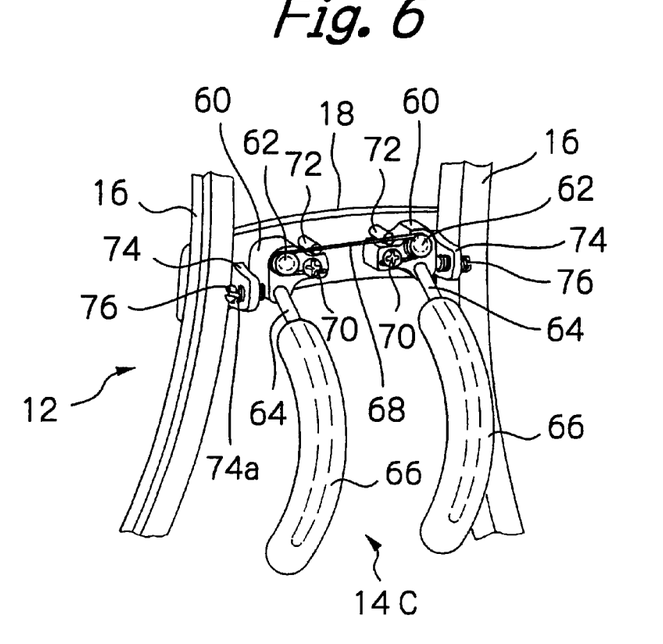

Referring next to FIG. 6, there is shown an alternative embodiment of the adjustable eyeglass frame according to the present invention. In this preferred embodiment, a nosepiece assembly 14C includes a pair of T-shaped block or pad mounts 60 pivotally mounted to the nasal side of the bridge 18 by pivot pins 62 and capable of rotation about a substantially horizontal axis. A pair of arcuate legs 64 are secured to the pad mounts 60. A pair of elongated nose pads 66 are placed around a substantial portion of the legs 64 and bent toward a wearer's nose (not shown). An elongated spring 68 extends around the pivot pins 62 and has opposite ends secured to the pad mounts 60 by screws 70. The spring 68 is used to inwardly bias the nose pads 66 toward each other so that the nose pads 66 slightly diverge toward the mouth (not shown) of the wearer in their initial position. A pair of fixed stoppers or pins 72 are secured to the nasal side of the bridge 18 above the screws 70 to limit inward angular movement of the nose pads 66. A pair of tabs 74 are secured to the lens mounts 16 and the bridge 18 and have threaded apertures 74a. A pair of adjustable screws 76 extend through the threaded apertures 74a and are selectively positioned to adjustably limit outward angular movement of the nose pads 66.

Figure 7:
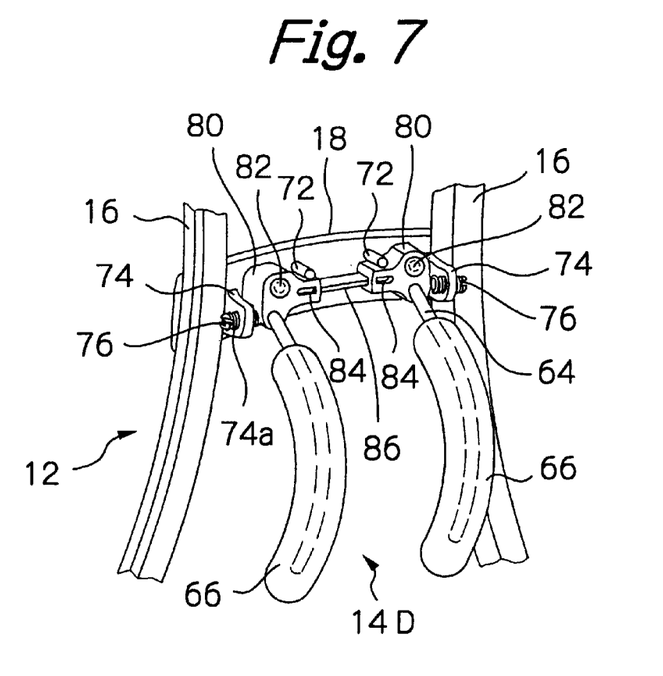

FIG. 7 shows a modified form of the nosepiece assembly shown in FIG. 6. Similarly, a nosepiece assembly 14D includes a pair of T-shaped pad mounts 80 pivotally mounted to the nasal side of the bridge 18 by pivot pins 82 and rotatable about a substantially horizontal axis. In this embodiment, the pad mounts 80 are formed at their one end with slots 84 into which opposite ends of a leaf spring 86 extend. This arrangement enables the nose pads 66 to be inwardly biased toward each other. The leaf spring 86 is bent downward as the nose pads 66 are laterally widened or upwardly rotated in a substantially vertical plane. The other parts are similar in structure and function to those of the embodiment shown in FIG. 6 and will not be described herein.

Figure 8:
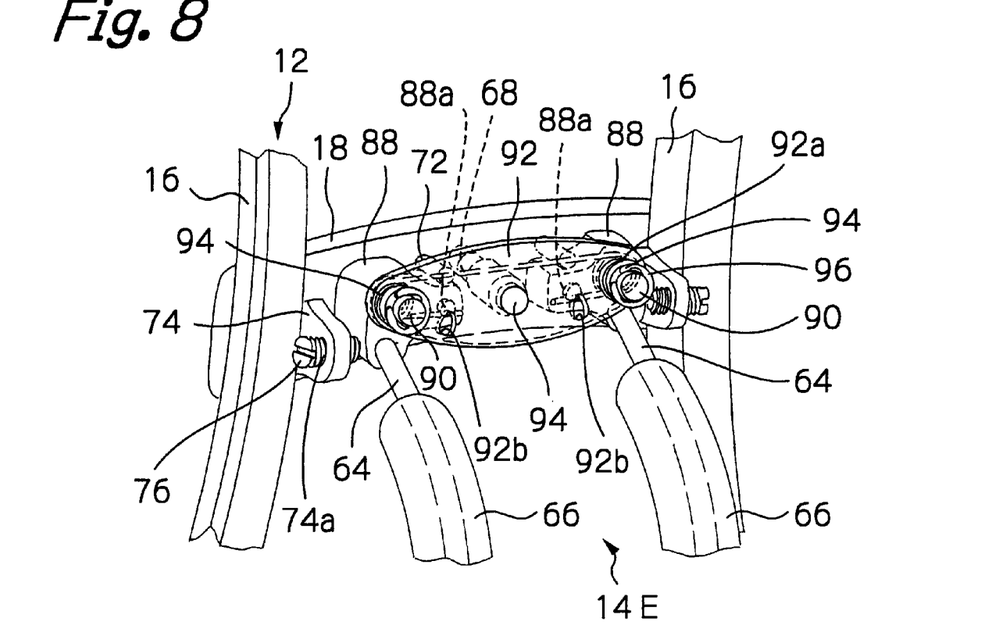

FIG. 8 shows another modified form of the nosepiece assembly shown in FIG. 6. Specifically, a nosepiece assembly 14E includes a pair of pad mounts 88 pivotally mounted to the bridge 18 by pivot pins 90 and capable of rotation about a substantially horizontal axis. The pivot pins 90 are longer than the pivot pins 62 shown in FIG. 6 and project rearwardly from the respective pad mounts 88. An oval plate 92 has opposite alignment apertures 92a through which the pivot pins 90 extend. A pair of coil springs 94 are disposed around a portion of the pivot pins 90 which project rearwardly from the pad mounts 88. A pair of stoppers or rings 96 extend around the free end of the pivot pins 90 to hold the coil springs 94 in position. The coil springs 94 are used to normally urge the oval plate 92 toward the pad mounts 88. A pair of protrusions 88a extend rearwardly from the pad mounts 88, and a pair of corresponding apertures 92b are defined in the oval plate 92. The protrusions 88a are held out of engagement with the apertures 92b when the lens frame assembly 12 is in its initial position shown in FIG. 8. When the nose pads 66 are outwardly or upwardly rotated, the protrusions 88a are brought into engagement with the apertures 92b to hold the lens frame assembly 12 in its lowered position. A rod 94 extends through the bridge 18 and is secured to the oval plate 92. As the rod 94 is pushed rearwardly toward the wearer, the protrusions 88a are disengaged from the apertures 92b. This allows the lens frame assembly 12 to be moved back to its initial position. As in the embodiment shown in FIG. 6, the spring 68 extends between and around the pivot pins 90 to inwardly bias the nose pads 66 toward each other. In this embodiment, the spring 66 is sandwiched between the pad mounts 88 and the oval plate 92.

Figure 9:
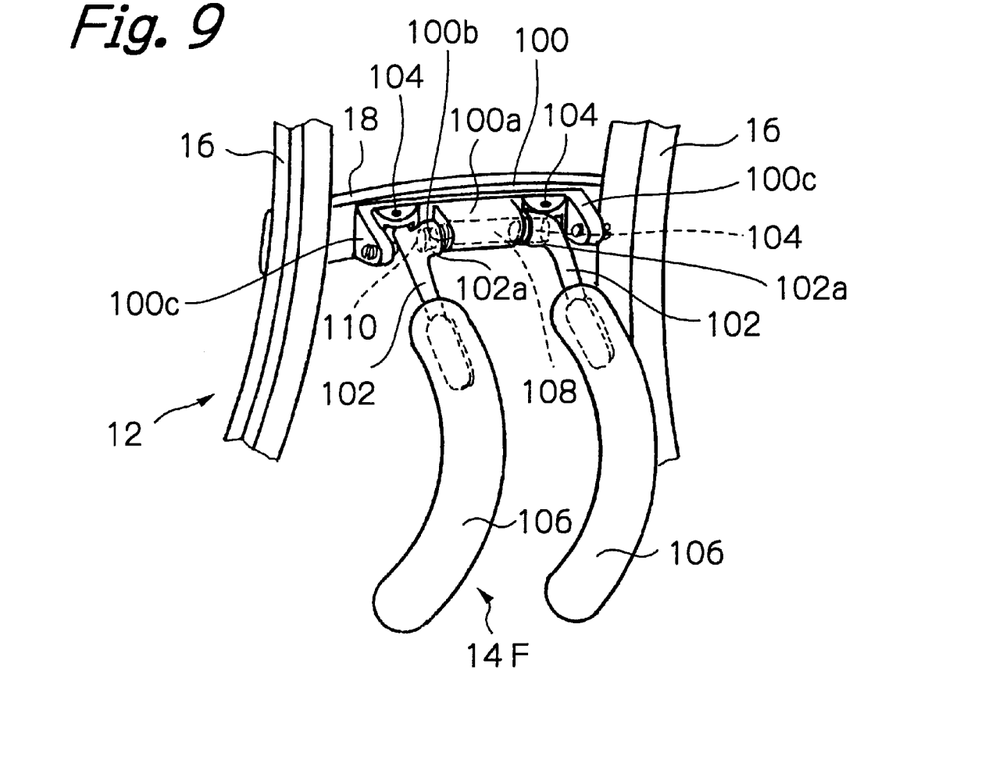
FIGS. 9 to 12 are enlarged perspective views of modified nosepiece assemblies with magnets as a bias mechanism.

In FIG. 9, a plurality of magnets are employed as a bias mechanism for inwardly biasing the nose pads toward each other. More specifically, a nosepiece assembly 14F includes an elongated pad mount 100 permanently secured to the nasal side of the bridge 18 and having an arch-shaped block 100a at its center, a pair of legs 102 having a proximal end pivotally mounted to the pad mounts 100 by pivot pins 104 and capable of rotation about a substantially vertical axis, and a pair of elongated nose pads 106 carried by the distal end of the legs 102 and bent rearwardly toward a wearer's nose (not shown). The block 100a of the pad mount 100 has a through bore 100b in which a magnet 108 is disposed. Opposite ends of the magnet 108 slightly project from opposite ends of the block 100a. The legs 102 have side projections 102a within which magnets 110 are disposed. The magnets 110 have a polarity opposite the polarity of the magnet 108 so that the nose pads 106 are inwardly biased toward each other. Opposite ends of the pad mount 100 are bent rearwardly at ninety degrees to provide a pair of opposite tabs 100c. The tabs 100a are similar in operation to those shown in FIG. 4 and will not be described herein.

Figure 10:
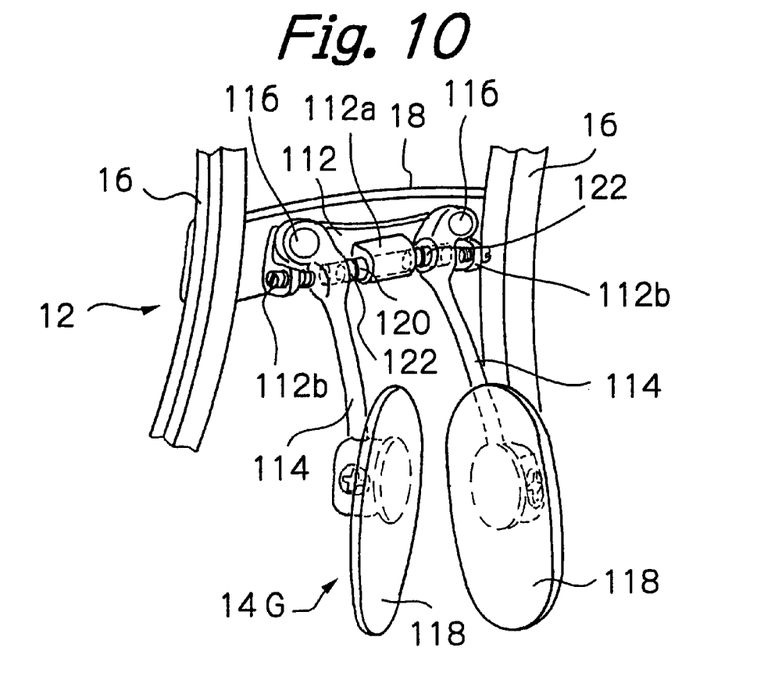

FIG. 10 shows a modified form of the nosepiece assembly shown in FIG. 9. In this embodiment, a nosepiece assembly 14G includes a pad mount 112 permanently secured to the nasal side of the bridge 18 and having a block 112a at its center, a pair of legs 114 having a proximal end pivotally mounted to the pad mount 112 by pivot pins 116 and capable of rotation about a substantially horizontal axis, and a pair of conventional oval nose pads 118 carried by the distal end of the legs 114. As in the embodiment shown in FIG. 9, a magnet 120 is disposed in the block 112a. Opposite ends of the magnet 120 slightly project from opposite ends of the block 112a. A pair of magnets 122 are mounted to the respective legs 114. The magnets 122 have a polarity opposite the polarity of the magnet 120 so that the nose pads 118 are inwardly biased toward each other and slightly diverge toward the mouth (not shown) of the wearer when the lens frame assembly 12 is in its initial position. Opposite ends of the pad mount 112 are bent rearwardly at ninety degrees to provide a pair of opposite tabs 112b. The tabs 112b are similar in operation to the tabs 100a shown in FIG. 9 and will not be described herein.

Figure 11:
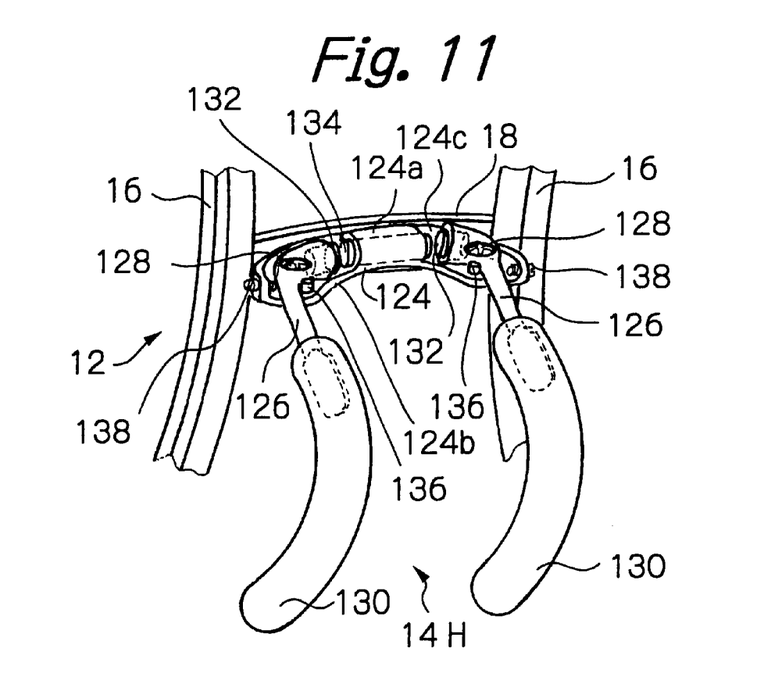

FIG. 11 shows another embodiment of the adjustable eyeglass frame according to the present invention. In this embodiment, a nosepiece assembly 14H includes an arcuate pad mount 124 secured to the bridge 18 and having an arch-shaped block 124a at its center, a pair of L-shaped legs 126 having a proximal end pivotally mounted to the pad mount 124 by pivot pins 128 and capable of rotation about a substantially vertical axis, and an elongated nose pads 130 carried by the distal end of the legs 126 and bet rearwardly toward a wearer's nose. A pair of identical magnets 132 are mounted to and slightly project from the proximal end of the legs 126. A magnet 134 is disposed in the block 124a and slightly projects from opposite ends of the block 124a. As opposed to the embodiments shown in FIGS. 9 and 10, the magnets 132 and 134 all have an identical polarity such that the legs 126 and thus, the nose pads 130 are inwardly biased toward each other. The pad mount 124 has an arcuate base plate 124b, and a vertical plate 124c extends around the front edge of the base plate 124b. A pair of fixed stoppers or pins 136 extend upwardly from the base plate 124b of the pad mount 124 adjacent the pivot pins 128 to limit inward angular movement of the legs 126. A pair of adjustable stoppers or screws 138 extend through the vertical plate 124c of the pad mount 124 to limit outward angular movement of the legs 126.

Figure 12:
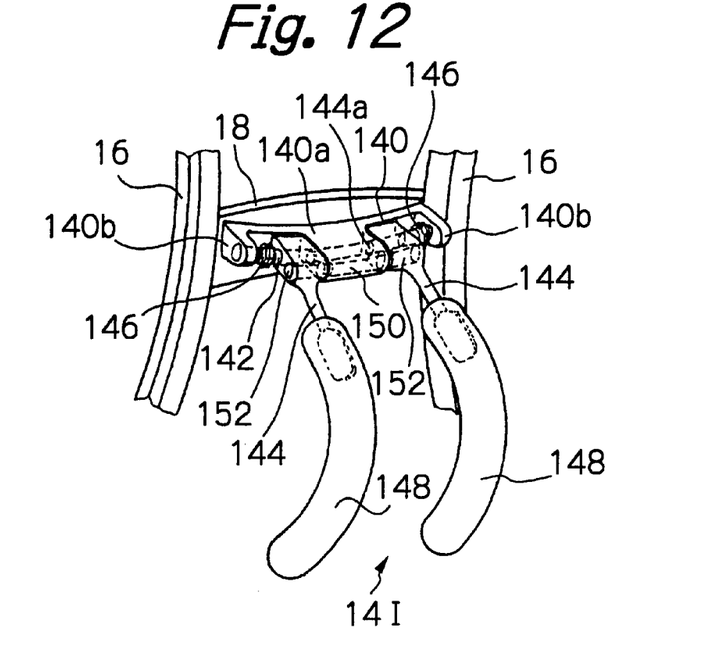

Referring to FIG. 12, a nosepiece assembly 14I includes a pad mount 140 permanently secured to the bridge 18. The pad mount 140 is arcuate in a downward direction and has a block 140a at its center. Opposite ends of the pad mount 140 are bent rearwardly at ninety degrees to provide a pair of opposite tabs 140b. An arcuate guide rod 142 extends through the block 140a and has opposite ends connected to the respective tabs 140b. A pair of legs 144 have bores 144a through which the guide rod 142 extends. The legs 144 are moveable along the guide rod 142. A pair of adjustable nuts 146 are threaded on the guide rod 142 and selectively positioned to adjustably limit outward angular movement of the legs 144. A pair of elongated nose pads 148 are attached to the distal end of the legs 144 and bent rearwardly toward a wearer's nose (not shown). A magnet 150 is embedded in the block 140a of the pad mount 140 and slightly projects from opposite ends of the block 140. Also, a pair of magnets 152 are embedded in the proximal end of the legs 144. The magnets 152 have a polarity opposite the polarity of the magnet 150 such that the legs 144 and thus, the nose pads 148 are inwardly biased toward each other.

Figure 13:
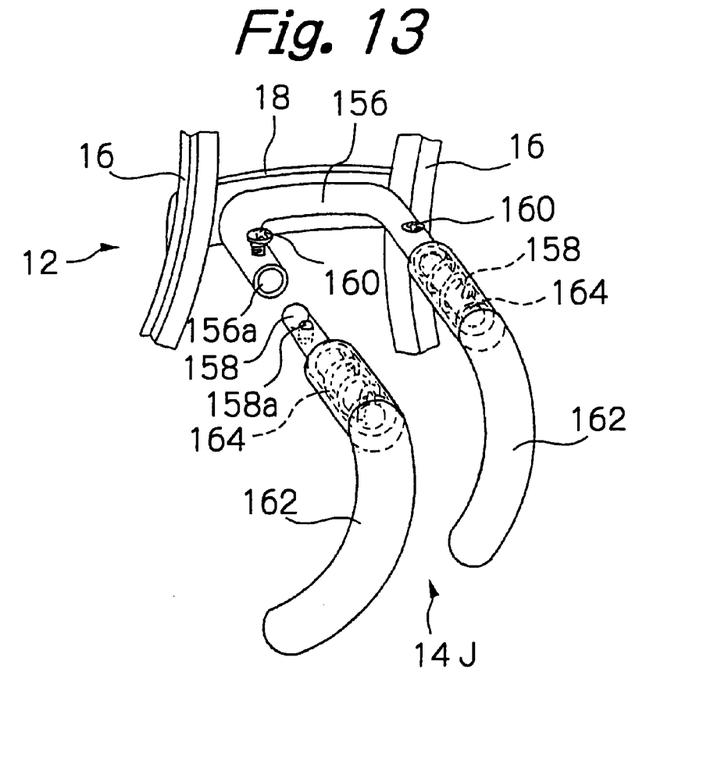
FIGS. 13 to 15 are enlarged perspective views of modified nosepiece assemblies with various forms of springs as a bias mechanism.

Referring now to FIG. 13, there is shown a different embodiment of the adjustable eyeglass frame according to the present invention. In the illustrated embodiment, a nosepiece assembly 14J includes a U-shaped tubular mount 156 permanently secured at its bottom to the bridge 18 of the lens frame assembly 12. A pair of short legs 158 have a proximal end fitted into opposite ends 156a of the tubular mount 156. An threaded aperture 158a is defined in the proximal end of each of the legs 158 to threadably receive a set screw 160. This enables the legs 158 to be firmly secured to the tubular mount 156. The distal end of the legs 158 are fitted into a pair of elongated nose pads 162. The nose pads 162 are bent rearwardly toward a wearer's nose (not shown). A pair of coil springs 164 are disposed around the distal end of the legs 158. The coil springs 164 have one end secured to the legs 158 and the other end secured within the nose pads 162. The nose pads 162 are normally biased toward each other as shown in FIG. 13. When the lens frame assembly 12 is lowered from its initial position, then the nose pads 162 are outwardly rotated about the axes of the respective springs 164. When the lens frame assembly 12 is elevated back to its initial position, the nose pads 162 are rotated back to their initial position.

Figure 14:
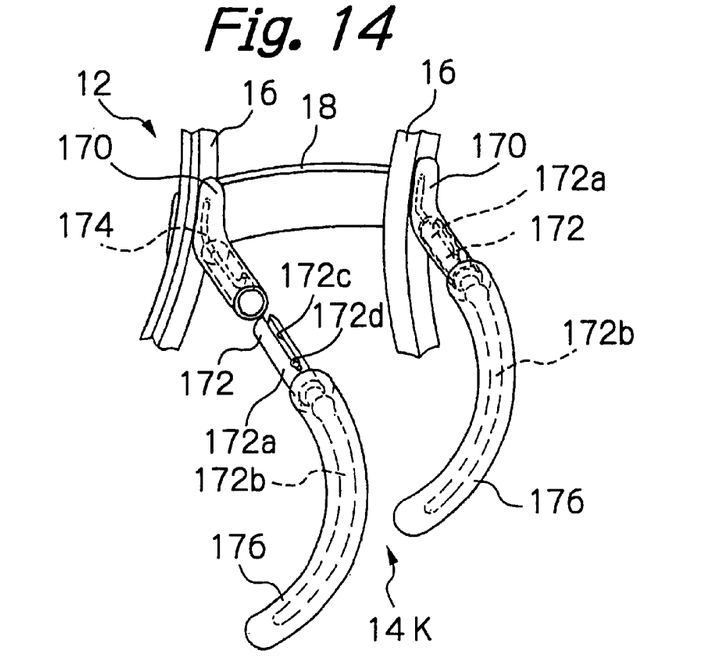

FIG. 14 shows another embodiment of the adjustable eyeglass frame according to the present invention. In the illustrated embodiment, a nosepiece assembly 14K includes a pair of bent tubular pad mounts 170 permanently secured to the lens mounts 16. A pair of legs 172 have a straight front portion 172a and an arcuate rear portion 172b extending rearwardly from the front portion 172a. An axial slit 172c is formed in the front portion 172a of each of the legs 172. A recess 172d is defined in the rear end of the slit 172c. A torsion spring 174 has a proximal end secured within each of the tubular mounts 170 and a bent distal end. When the front portion 172a of the leg 172 is inserted into the tubular mount 170, the bent end of the torsion spring 174 is brought into engagement with the recess 172d. A pair of elongated nose pads 176 are disposed around the rear portion 172b of the legs 172 and bent toward a wearer's nose (not shown). The torsion springs 174 are employed to inwardly bias the nose pads 176 toward each other so that the nose pads 176 slightly diverge toward the mouth (not shown) of the wearer when the lens frame assembly 12 is in its initial position. The nose pads 176 are outwardly or upwardly rotated about the axes of the torsion springs 174 against the bias of the torsion springs 174 when the lens frame assembly 12 is lowered from its initial position. The nose pads 176 are moved back to their initial position when the lens frame assembly 12 is moved back to its initial position.

Figure 15:
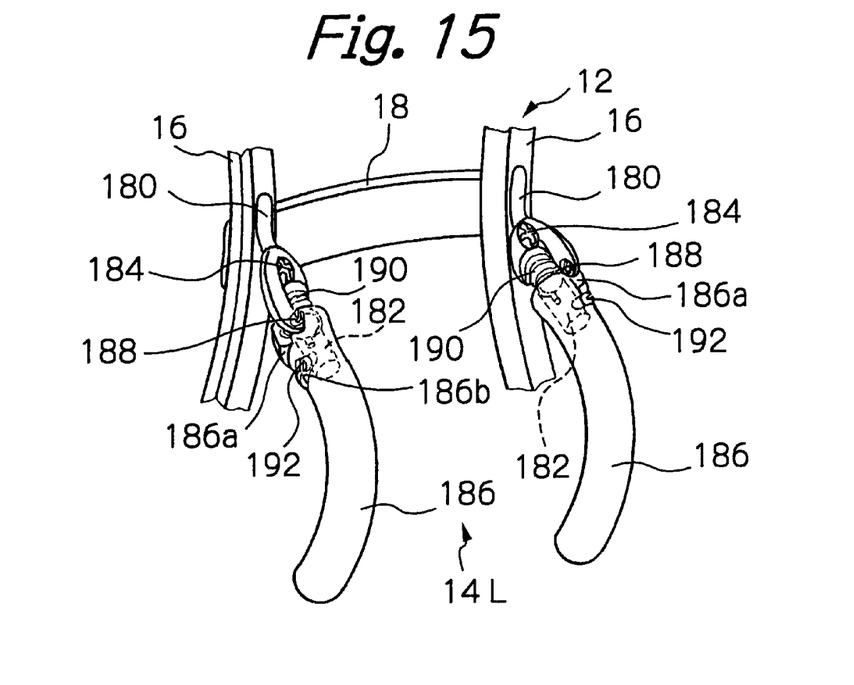

FIG. 15 shows still another embodiment of the adjustable eyeglass frame according to the present invention. Specifically, a nosepiece assembly 14L includes a pair of pad mounts 180 having a proximal end permanently secured to the lens mounts 16 and a bifurcated distal end. A pair of cylindrical short legs 182 have one end secured to the distal end of the pad mounts 180 by screws 184 and the other end inserted into a pair of elongated nose pads 186. The nose pads 186 are bent rearwardly toward a wearer's nose. The nose pads 186 are formed at their front end with steps 186a. A screw 188 extends between the distal end of each of the pad mounts 180 and the step 186a of the nose pad 186 so as to secure the nose pad 186 to the respective pad mount 180. A pair of coil springs 190 are disposed around a part of the short legs 182. The coil springs 190 have one end secured to the distal end of the pad mounts 180 and the other end secured within the nose pads 186. This arrangement enables the nose pads 186 to be inwardly biased toward each other. An arcuate slot 186b is defined in the periphery of each of the nose pads 186. A screw or stopper 192 is fixed to the short leg 182 and positioned in the slot 186b. When the lens frame assembly 12 is placed in its normal position as shown in FIG. 15, the screw 192 is positioned in the upper end of the slot 186b. When the nose pads 186 are upwardly rotated about the axes of the coil springs 190 against the bias of the springs 190, the screws 192 are located in the lower end of the slot 186b. The screws 192 and the slots 186b collectively form a means for limiting inward and outward angular movement of the nose pads 186.

Figure 16:
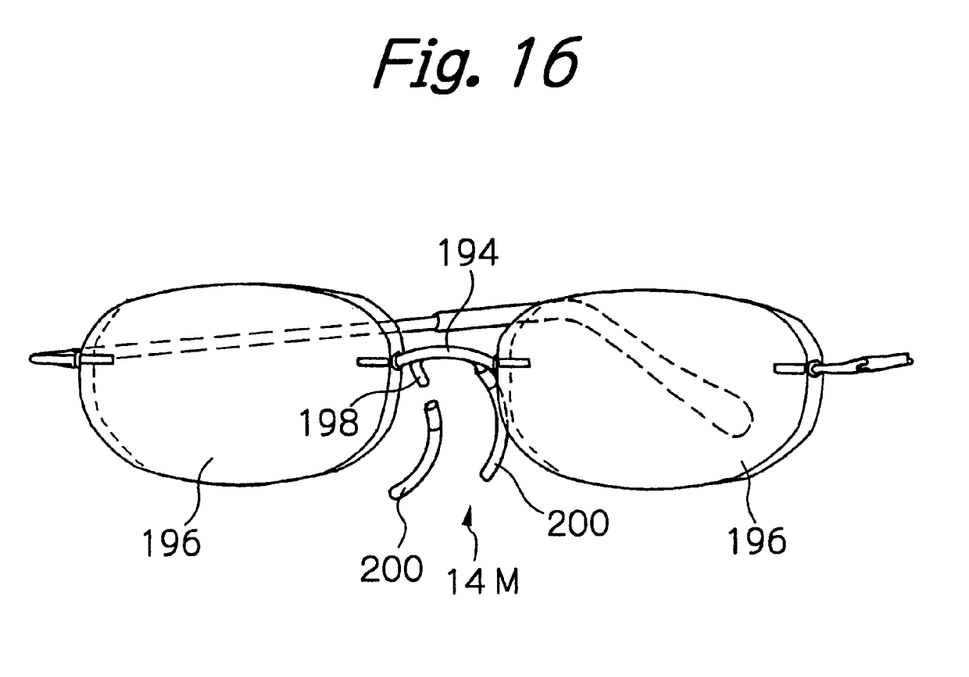
FIG. 16 is a perspective view of rimless eyeglasses with a modified form of the nosepiece assembly partly disassembled.
Figure 17:
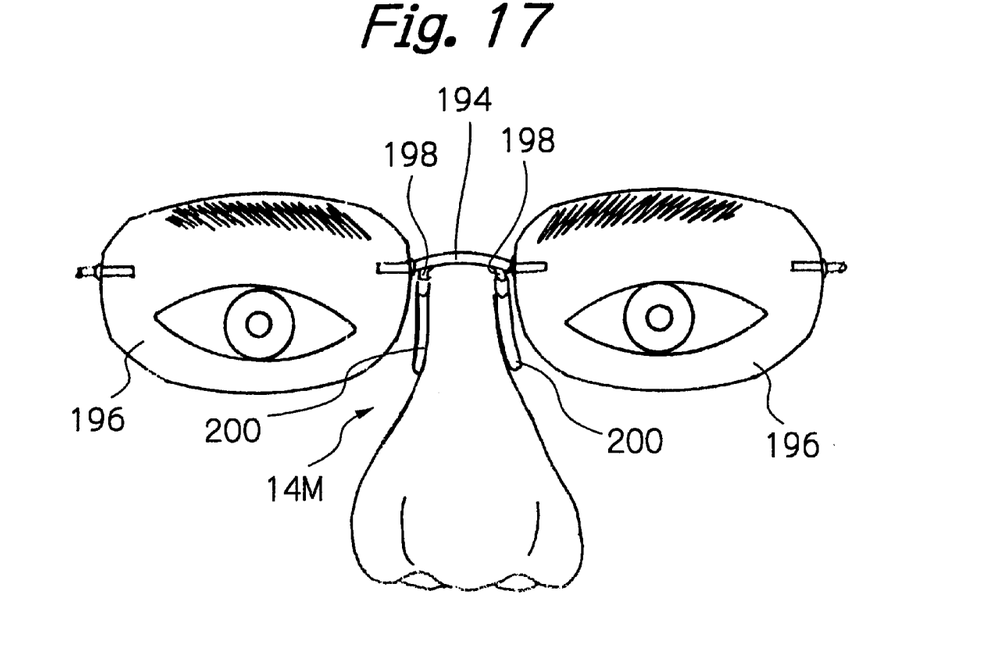
FIG. 17 is a front view of the rimless eyeglasses with a pair of nose pads in their normal position.
Figure 18:
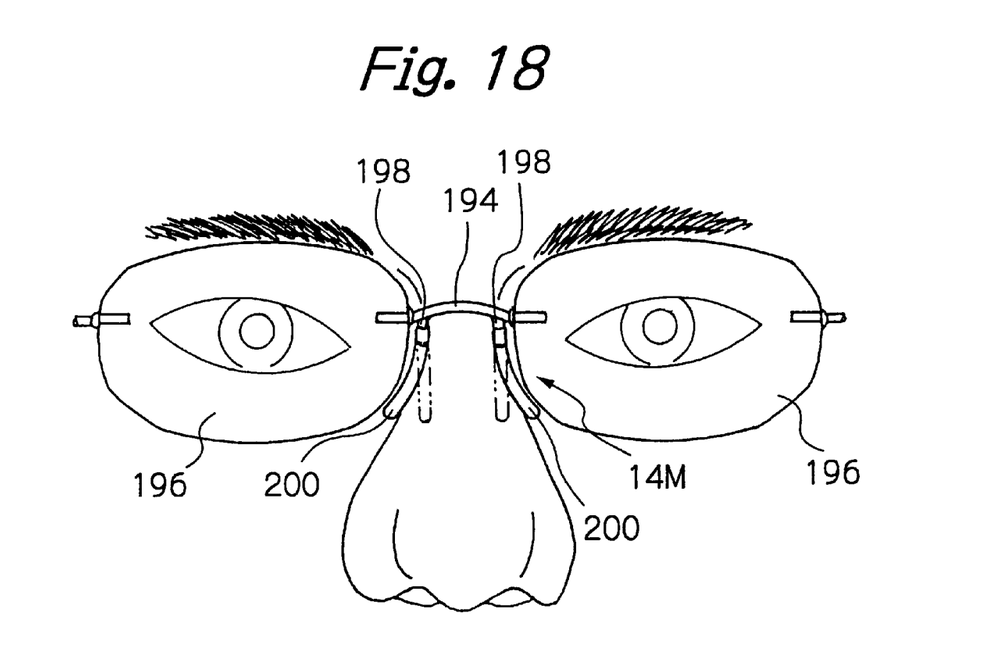
FIG. 18 is a view similar to that of FIG. 17, but showing that the nose pads are in their lowered position.

Referring to FIG. 16, there is shown a further embodiment of the adjustable eyeglass frame according to the present invention. As shown, a nosepiece assembly 14M includes a pad mount 194 for interconnecting a pair of lenses 196, a pair of short legs 198 secured to the pad mount 194, and a pair of elongated nose pads 200 tightly fitted over the legs 198. In the illustrated embodiment, the pad mount 194 also serves as a bridge. The nose pads 200 are made of a suitable elastomeric material such as synthetic rubber and bent rearwardly toward a wearer's nose. When the nosepiece assembly 14M is in its normal position as shown in FIG. 17, the nose pads 200 extend in parallel or slightly diverge toward the mouth (not shown) of the wearer. When the nosepiece assembly 14M is moved to their lowered position as shown in FIG. 18, the nose pads 200 are upwardly rotated in a substantially vertical plane. Advantageously, the nosepiece assembly 14M is moveable between any selected vertical positions and angularly adjustable to comfortably fit the bridge of the wearer's nose.

Figure 19:
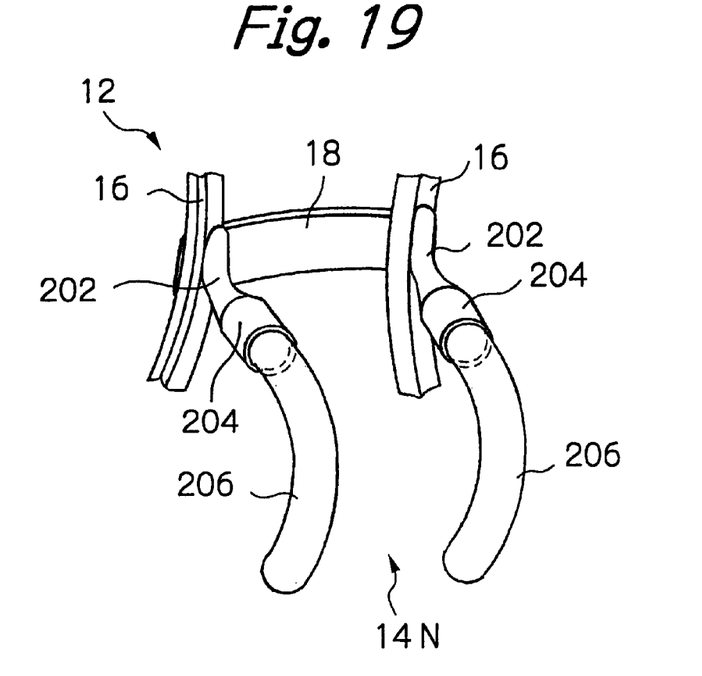
FIGS. 19 to 22 are enlarged perspective views of modified nosepiece assemblies.

Referring to FIG. 19, a nosepiece assembly 14N includes a pair of pad mounts 202 having one end secured to the lens mounts 16, a hollow tubular leg 204 extending from the other end of the pad mounts 202, and a pair of elongated nose pads 206 tightly fitted into the legs 204. The nose pads 206 are made of a suitable elastomeric material such as synthetic rubber and bent rearwardly toward a wearer's nose (not shown). The operation of this embodiment is similar to that of the embodiment shown in FIG. 16 and will not be described herein.

Figure 20:
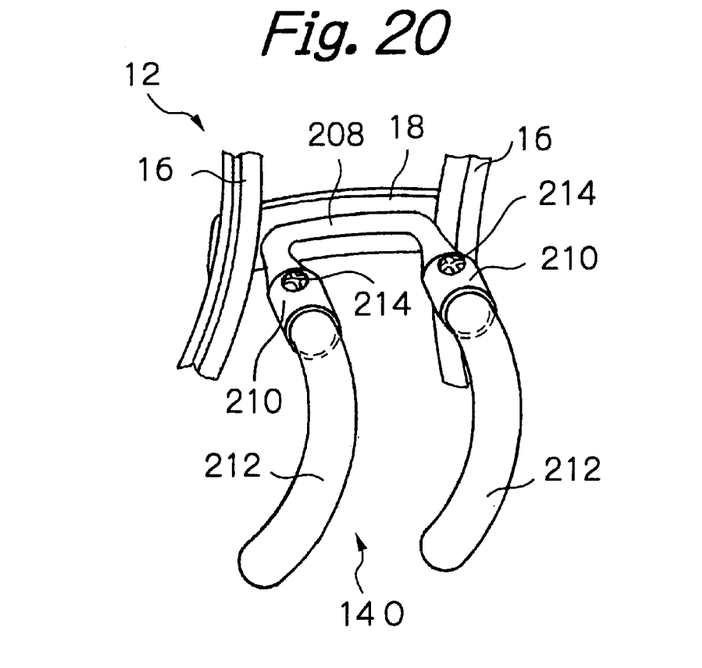

Referring to FIG. 20, a nosepiece assembly 140 includes a U-shaped pad mount 208 permanently secured at its bottom to the bridge 18, a pair of short legs or hollow tubes 210 having one end connected to the pad mount 208, and a pair of elongated nose pads 212 fitted into the other end of the legs 210 and bent rearward toward a wearer's nose (not shown). A pair of screws 214 are used to secure the nose pads 212 to the legs 210. Alternatively, the nose pads 212 may be adhesively secured to the legs 210. The operation of this embodiment is similar to that of the embodiment shown in FIG. 16 and will not be described herein.

Figure 21:
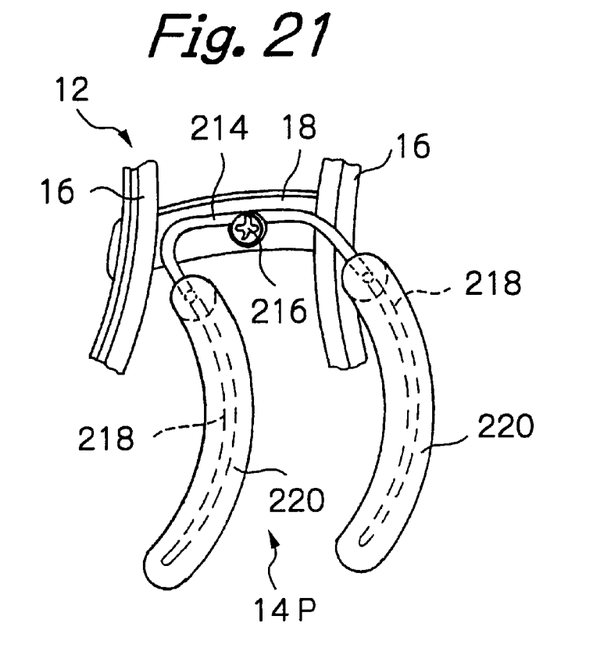

Referring to FIG. 21, a nosepiece assembly 14P includes a U-shaped pad mount 214 secured to the bridge 18 by a screw 216, a pair of arcuate legs 218 unitarily connected to the pad mount 214, and a pair of nose pads 220 fitted around the legs 218. The pad mount 214 and the legs 218 are integrally made, for example, from a spring steel. The nose pads 220 are made of a suitable elastomeric material such as synthetic rubber and bent rearwardly toward a wearer's nose (not shown). The operation of this embodiment is similar to that of the embodiment shown in FIG. 20 and will not be described herein.

Figure 22:
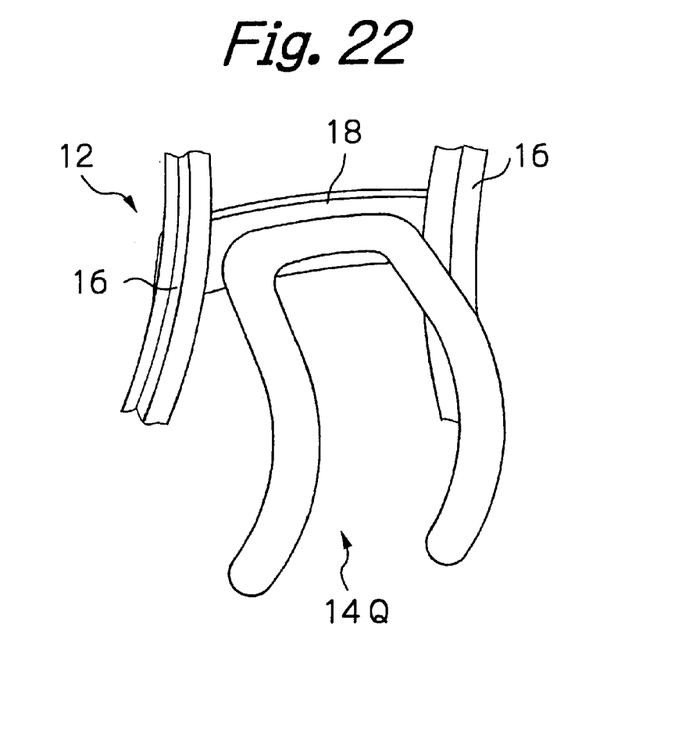

As shown in FIG. 22, a nosepiece assembly 14Q may be integrally formed as a one-piece structure. In such a case, the nosepiece assembly 14Q may have a U-shape and may be secured to the bridge 18 by, for example, adhesive.

Figure 23:
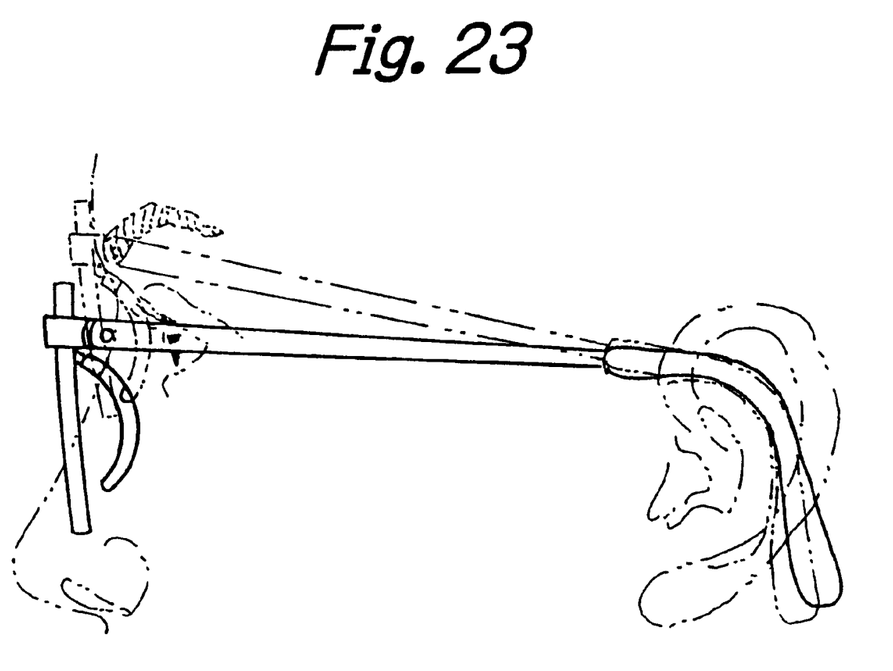
FIG. 23 is a side view of eyeglasses with a vertical adjusting mechanism.

Although the present invention has been described with respect its preferred embodiments, it is to be understood that various changes and modifications may be made without departing from the scope of the invention. For example, the temples of the lens frame assembly may have a vertical adjusting mechanism (see FIG. 23) as disclosed by U.S. Pat. No. 6,183,080 issued to Negishi, the contents of which are incorporated therein by reference.

What is claimed is:

1. An adjustable eyeglass frame comprising:
   a lens frame assembly adapted to hold a pair of lenses; and
   a nosepiece assembly including at least one pad mount mounted to said lens frame assembly, a pair of legs having a proximal end connected to said at least one pad mount and a distal end, a pair of independent nose pads carried by said distal end of said pair of legs and movable toward and away from each other with respect to a wearer's nose, and a bias mechanism for biasing said pair of independent nose pads toward each other with respect to the wearer's nose whereby said pair of nose pads are held in selected vertical positions.

2. An adjustable eyeglass frame according to claim 1, wherein said pair of nose pads are elongated and bent rearwardly toward the wearer's nose.

3. An adjustable eyeglass frame according to claim 1, wherein said lens frame assembly includes a pair of lens mounts and a bridge extending between said pair of lens mounts, and said at least one pad mount is secured to said bridge, and wherein said pair of legs are pivotably mounted to said at least one pad mount and capable of rotation about a substantially vertical axis.

4. An adjustable eyeglass frame according to claim 3, wherein said pair of nose pads are elongated and bent rearwardly toward the wearer's nose.

5. An adjustable eyeglass frame according to claim 3, wherein said at least one pad mount has opposite tabs, and a pair of adjustable stoppers extending through said opposite tabs and selectively positioned to adjustably limit outward angular movement of said pair of nose pads.

6. An adjustable eyeglass frame according to claim 1, further comprising a pair of pad mounts secured to said lens frame assembly, wherein said pair of legs are pivotably mounted to said pair of pad mounts and capable of rotation about a substantially vertical axis, and said bias mechanism includes a pair of springs having a proximal end connected to said pair of pad mounts and a distal end connected to said pair of legs.

7. An adjustable eyeglass frame according to claim 1, further comprising a pair of pad mounts, wherein said lens frame assembly includes a pair of lens mounts and a bridge extending between said pair of lens mounts, said pair of pad mounts being pivotably mounted to said bridge and capable of rotation about a substantially horizontal axis, and wherein said pair of legs are secured to said pair of pad mounts.

8. An adjustable eyeglass frame according to claim 7, wherein said bias mechanism includes an elongated spring extending between said pair of pad mounts and adapted to bias said pair of nose pads toward each other.

9. An adjustable eyeglass frame according to claim 7, wherein said bias mechanism includes a leaf spring extending between said pair of pad mounts and adapted to bias said pair of nose pads toward each other.

10. An adjustable eyeglass frame according to claim 7, wherein said lens frame assembly includes a pair of opposite tabs, a pair of adjustable stoppers extending through said opposite tabs and selectively positioned to adjustably limit outward angular movement of said pair of nose pads, and a pair of spaced pins secured to said bridge and adapted to limit inward angular movement of said pair of nose pads.

11. An adjustable eyeglass frame according to claim 1, wherein said lens frame assembly includes a pair of lens mounts and a bridge extending between said pair of lens mounts, and said at least one pad mount is secured to said bridge, and wherein said pair of legs are pivotably mounted to said at least one pad mount and capable of rotation about a substantially vertical axis, and said bias mechanism includes a first magnet disposed in said at least one pad mount, and second and third magnets disposed in said pair of legs, said first magnet having a polarity opposite that of said second and third magnets.

12. An adjustable eyeglass frame according to claim 11, wherein said pair of nose pads are elongated and bent rearwardly toward a wearer's nose.

13. An adjustable eyeglass frame according to claim 1, wherein said lens frame assembly includes a pair of lens mounts and a bridge extending between said pair of lens mounts, and said at least one pad mount is secured to said bridge, and wherein said pair of legs are pivotably mounted to said at least one pad mount and capable of rotation about a substantially horizontal axis, and said bias mechanism includes a first magnet disposed in said at least one pad mount, and second and third magnets disposed in said pair of legs, said first magnets having a polarity opposite that of said second and third magnets.

14. An adjustable eyeglass frame according to claim 1, wherein said lens frame assembly includes a pair of lens mounts and a bridge extending between said pair of lens mounts, and said at least one pad mount is secured to said bridge, wherein said pair of legs are pivotably mounted to said at least one pad mount and capable of rotation about a substantially vertical axis, and wherein said bias mechanism includes a first magnet disposed in said at least one pad mount, and second and third magnets disposed in said pair of legs, said first, second and third magnets having an identical polarity, said at least one pad mount including a pair of spaced stoppers for limiting inward angular movement of said pair of nose pads.

15. An adjustable eyeglass frame according to claim 1, wherein said pair of nose pads are elongated and bent rearwardly toward the wearer's nose, and said at least one pad mount is a substantially U-shaped tube with hollow opposite ends, wherein said proximal end of said pair of legs are inserted into said hollow opposite ends of said at least one pad mount, and said distal end of said pair of legs are inserted into said pair of nose pads, and wherein said bias mechanism includes a pair of coil springs disposed around said distal end of said pair of legs and having a proximal end connected to said pair of legs and a distal end connected to said pair of nose pads, said pair of nose pads being rotatable about axes of said pair of coil springs.

16. An adjustable eyeglass frame according to claim 1, further comprising a pair of pad mounts having a proximal end secured to said lens frame assembly and a hollow distal end, wherein said pair of legs have a proximal end inserted into said hollow distal end of said pair of pad mounts and an elongated distal end bent rearwardly toward the wearer's nose, and said pair of nose pads are disposed around said distal end of said pair of legs, and wherein said bias mechanism includes a pair of torsion springs disposed within said pair of pad mounts and having a proximal end secured within said pair of pad mounts and a distal end secured to said pair of legs, said pair of nose pads being rotatable about axes of said pair of torsion springs.

17. An adjustable eyeglass frame comprising:
    a lense frame assembly adapted to hold a pair of lenses in position; and
    a nosepiece assembly including at least one pad mount secured to said lens frame assembly, a pair of legs extending from said at least one pad mount, and a pair of elongated independent nose pads carried by said pair of legs and bent rearwardly toward a wearer's nose, said pair of elongated independent nose pads being rotatable about a substantially horizontal axis and held in selected vertical positions.

* * * * *